A. COX.
PERCH.
APPLICATION FILED FEB. 7, 1911.
1,044,994. Patented Nov. 19, 1912.
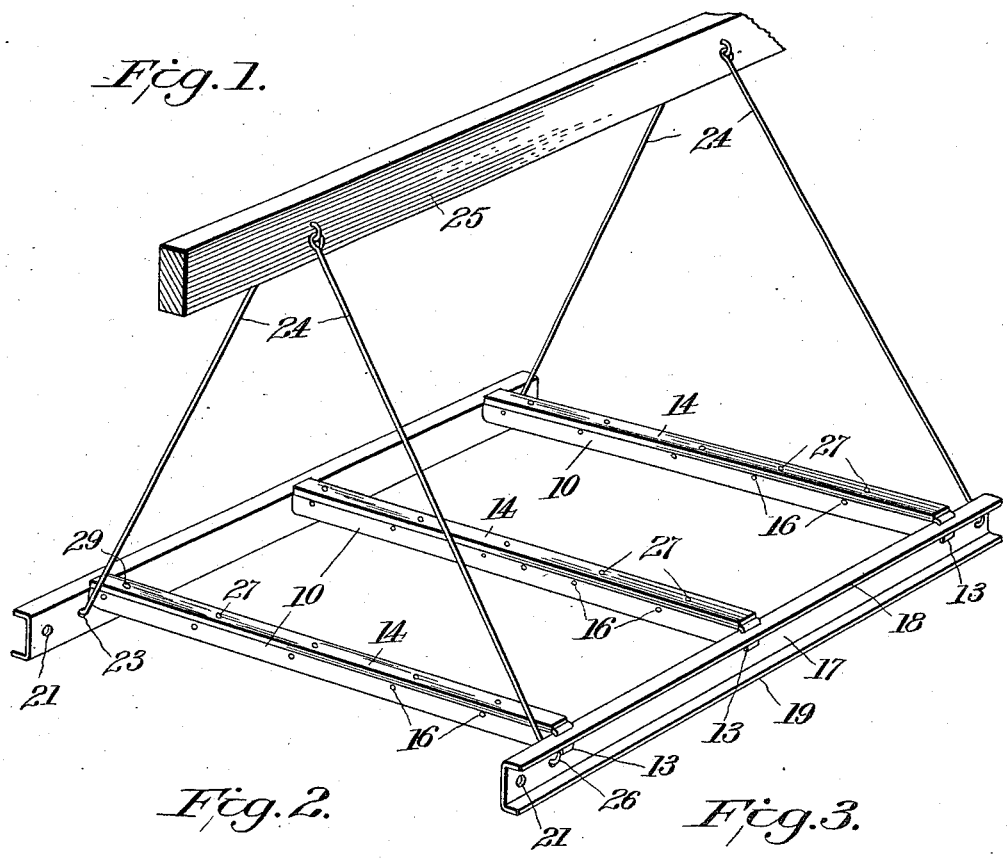
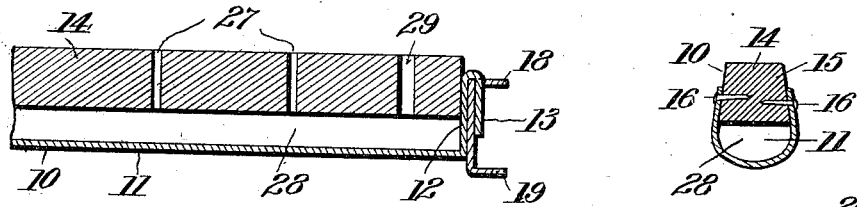
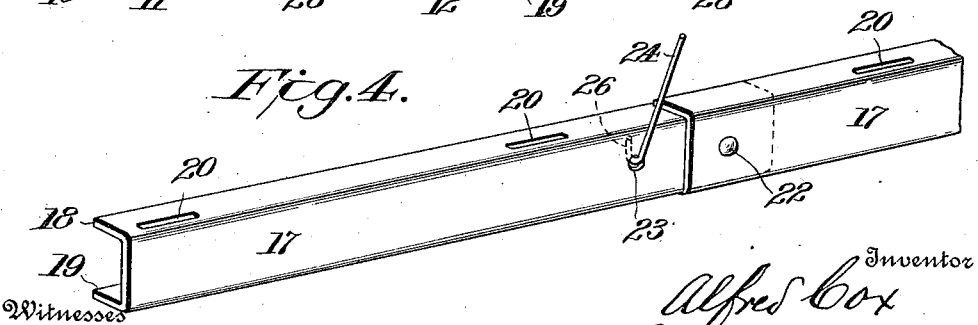
Witnesses
C. W. Walker.
G. B. Jones.
Inventor
Alfred Cox
By
Attorney

UNITED STATES PATENT OFFICE.

ALFRED COX, OF LAWRENCEBURG, TENNESSEE.

PERCH.

1,044,994.  Specification of Letters Patent.  Patented Nov. 19, 1912.

Application filed February 7, 1911. Serial No. 607,135.

*To all whom it may concern:*

Be it known that I, ALFRED COX, a citizen of the United States, residing at Lawrenceburg, in the county of Lawrence and State of Tennessee, have invented certain new and useful Improvements in Perches, of which the following is a specification.

This invention relates generally to perches or roosts for fowls, and specifically to knock-down and removable roosts or perches.

The principal object of the invention is to provide light, cheap and easily transportable perches or roosts which may be quickly assembled or disassembled when desired.

A further object of the invention is to provide an easily transportable knock-down perch or roost with effective means for disinfecting the fowl house and fowls.

A further object of the invention is to improve the specific construction and operation of such devices.

With these objects in view, the invention consists in the improved construction, arrangement and combination of parts of a knock-down, removable fowl roost or perch, which will be fully described hereinafter, the particular points of novelty being specifically pointed out in the appended claims.

In order that others may be enabled to make and use the invention, there will now be specifically described, the construction and operation of a preferred embodiment thereof which is illustrated in the accompanying drawing in which—

Figure 1, represents, in perspective view, a set of three perches suspended from an overhead support. Fig. 2, represents a sectional view on a vertical plane passing longitudinally through one of the perches and transversely through one of the side bars to which the perch is attached. Fig. 3, represents a sectional view on a vertical plane passing transversely through the perch. Fig. 4, represents, in perspective view, one of the side bars, detached, showing the manner of attaching the suspending wire, and of attaching another section thereto.

Like reference characters indicate the same parts wherever they appear in the several figures of the drawing.

Referring specifically to the drawing, 10 indicates one of the perches which is constructed of a trough 11 preferably of substantially semi-cylindrical form, the bottom being curved and the sides being, if desired, partially vertical, and the ends each formed preferably of a piece of metal 12, of the form of the end of the trough with the addition of an upward projection above the top of the trough adapted to be turned downward, substantially parallel with the end to form a hook 13.

The trough and its ends are preferably formed of tin, and the ends are preferably secured to the body by soldering, although it will be obvious that the body and ends may be formed of other suitable material and the ends secured in position on the body in any suitable manner to make the trough liquid tight. The hooks may also be constructed of other material, formed with the body or ends of the trough, or secured thereto in any suitable manner.

The main body of the perch is indicated at 14, preferably formed of wood, of a size to fit into the trough snugly and to project slightly above the upper edges thereof, to prevent contact of the feet of the fowls with the upper edges of the metallic trough, as clearly shown at 15, in Fig. 3. The main body 14 is secured in position in the trough by any suitable means, such, for instance, as nails or screws as shown at 16 in Fig. 1.

At 17 is indicated one of the side bars made of sheet metal, galvanized, tinned or otherwise coated to avoid oxidation, and flanged, preferably at its edges, as at 18 and 19, to give stiffness with economy of material and weight. In each side bar 17 preferably at the junction of the main body thereof and the top flange 19, are formed slots 20, to receive the hooks 13 of the perch. Holes 21 are formed in the body of each side bar near its ends to receive bolts or rivets 22 to attach adjacent sections of side bars together to extend the structure, and holes 23 are formed also in the main body of each of the side bars to receive wires 24 to suspend the structure from any suitable elevated support, as at 25 in Fig. 1 which is shown as a central bar or beam to be detachably secured to the joists or other overhead parts of the fowl house, but it will be obvious that the wires may be secured to the joists or other supports direct, without the intervention of the bar 25, such bar, however, being sometimes indispensable where there are no convenient overhead supports in the house.

The wires 24 are preferably formed with readily detachable hooked ends 26 so as to be quickly engaged in the holes 23 in the side bars, and in holes, or upon suitable staples or hooks, provided in or on said bar 25, it being desirable sometimes to permanently attach the wires to the bar 25 to prevent detachment, and possible loss of the wires in moving the perches from place to place.

When a section of the improved perches are disassembled for storage or transportation, they may be made into a very compact bundle, and to set them up for use it is only necessary to secure the bar or beam 25, engage the wires therewith if detached therefrom, engage the side bars 17 with the hooked ends 26 of the wires and then slip the hooks 13 into the slots 20 of the side bars. The hooks 13 being formed of sheet metal they have a wide bearing on the edges of the slots 20 and being parallel with the ends of the troughs 11 of the perches 10, they snugly hug the main body of the side bars and thus make a strong and rigid structure. The main body 14 of each perch is provided, at intervals, with holes or openings 27 extending vertically through it and communicating with the interior 28 of the trough below said main body. Either before or after assembling the parts together as before described, liquid disinfectant is poured into the space 28 through a larger hole 29 through the main body 14 of the perch near one end, and the wooden body will become saturated therewith, and the liquid will evaporate through the holes 27, thus always keeping the perches and their occupants free from vermin and destroying the germs of communicable diseases.

While the various parts have been specifically described, it will be obvious that many changes from and variation in such specific constructions may be made, without departing from the spirit and scope of the invention.

Having thus fully described the invention, what is claimed as new is:

1. A perch of the character described comprising a trough including sides inclined inwardly at the top, a perforated body having its sides inclined inwardly to correspond with the inclined sides of the trough, and forced into the trough between the sides of the latter and held in the trough with its upper portion projecting above the upper edges of the trough, the ends of the trough being bent back on themselves to form flat hooks, in combination with side bars each having a flange provided with a slot arranged at the juncture of the body portion of the bar and its flange, said slot being adapted to receive the corresponding hook of the trough, the hooks extending over the upper edge of said bars and having comparatively broad bearing engagement on opposite sides of the bodies of said bars to firmly support the perch.

2. A perch of the character described comprising a trough including sides inclined inwardly at the top, a perforated body having its sides inclined inwardly at the top to correspond with the inclined sides of the trough, and forced into the trough between the sides of the latter and held in the trough with its upper portion projecting above the upper edges of the trough, the ends of the trough being bent back on themselves to form flat hooks, in combination with side bars each having a flange provided with a slot arranged at the juncture of the body portion of the bar and its flange, said slot being adapted to receive the corresponding hook of the trough, the hooks extending over the upper edge of said bars and having comparatively broad bearing engagement on opposite sides of the bodies of said bars to firmly support the perch, said bars having perforations, and supporting wires provided with rigid hooks for engagement in said perforations of the bars to suspend the latter.

3. A perch of the character described, comprising a trough composed of sheet metal including sides inclined inwardly at the top, the trough containing a disinfectant, and a main perforated body fitted in the trough through the open top thereof between said inclined sides and projecting above the upper edges of the sides of the trough, one of the perforations being larger than the others, and means for securing said main perforated body firmly between said sides of the trough.

In testimony whereof I affix my signature in presence of two witnesses.

ALFRED COX.

Witnesses:
 JOHN COX,
 CLARA COX.

---

Copies of this patent may be obtained for five cents each, by addressing the "Commissioner of Patents, Washington, D. C."